United States Patent Office 3,286,451
Patented Nov. 22, 1966

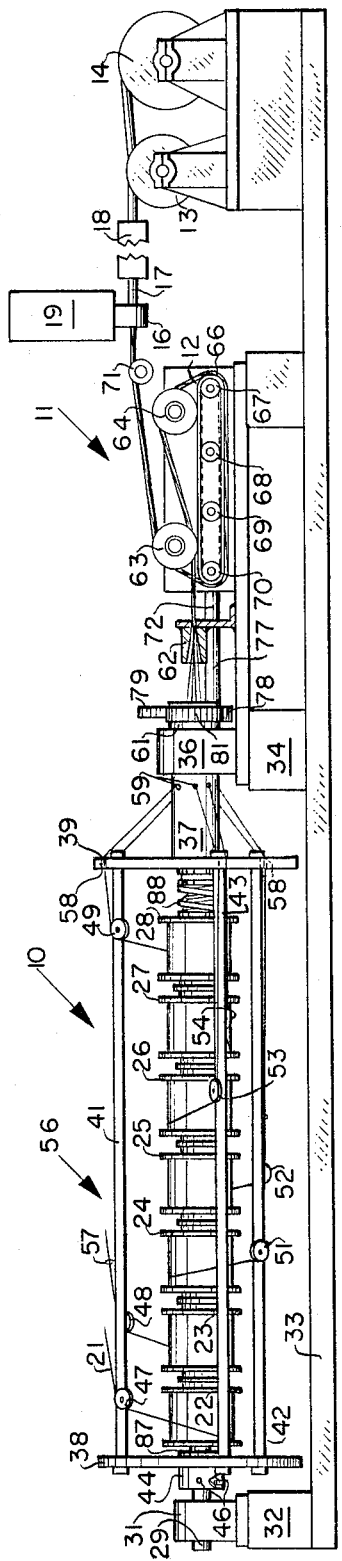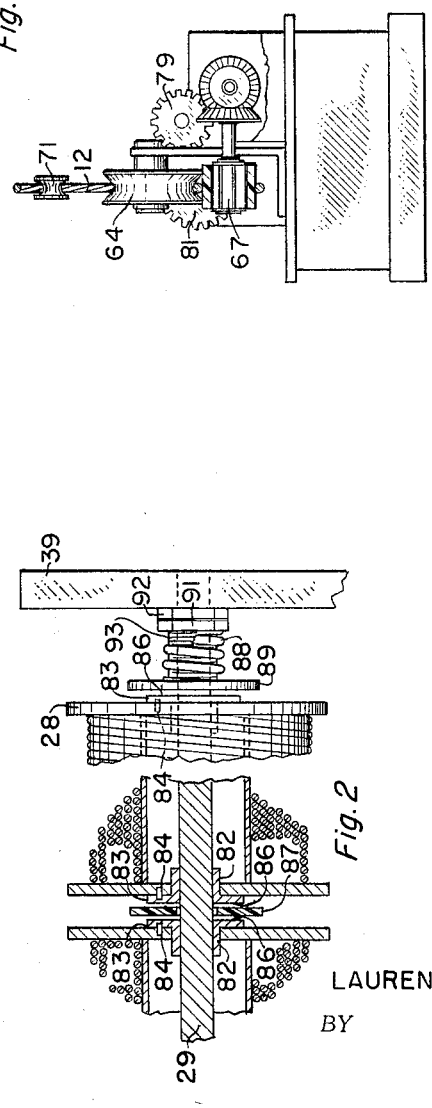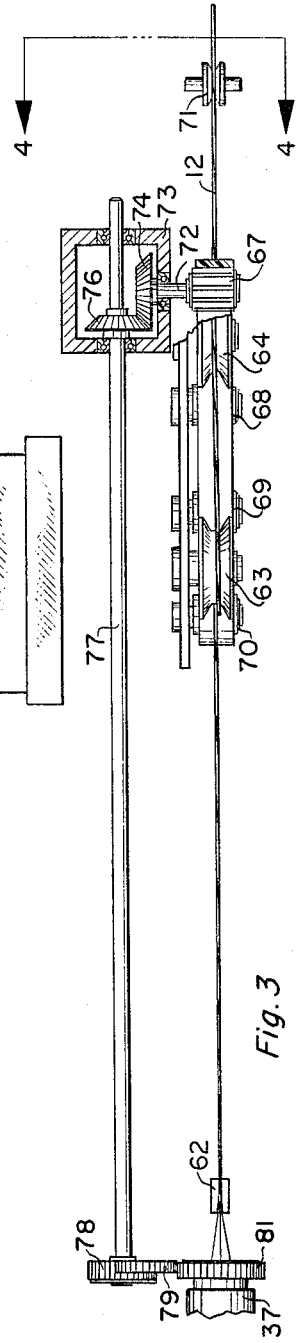

3,286,451
STRANDER
Laurence B. Woolman, Marion, Ind., assignor to Anaconda Wire and Cable Company, a corporation of Delaware
Filed Mar. 24, 1965, Ser. No. 442,246
3 Claims. (Cl. 57—58.32)

My invention relates to a cable strander and particularly to a strander suitable for operation in combination with other strand-processing apparatus such as an extruder.

In the manufacture of insulated conductors it has been long customary to form a conductor strand by helically winding together a plurality of conducting wires, to take up the strand thus formed upon reels, mount the reels of strand behind a plastic extruder or other processing apparatus, and pass the strand through the extruder to apply a layer of insulating material. This practice has the disadvantage that two sets of pay-off and take-up apparatus are required, one for the strander and one for the extruder. Prior to my invention, however, it has not been practicable to form strand directly at an extruder in a single operation because, whereas a strander operates at a fixed, constant speed, the speed of advance of strand passing through an extruder is varied within a more or less narrow range to adjust the thickness of the insulation wall.

I have overcome these obstacles by inventing a strander which is light enough in weight and simple enough in operation to change speed readily according to the varying requirements of an extruder or other apparatus. Furthermore I have invented a stranding apparatus that is driven by the advancing strand being stranded so that its speed is determined by the speed of advancement of the strand and varies therewith.

I have invented a new apparatus for forming an insulated, stranded conductor comprising an extruder, a rotating strander mounted upstream of the extruder, a capstan pulling the conductor through both the extruder and the strander and driving means rotating the strander. The strander helically winds a plurality of wires thereby forming a stranded conductor that pays into the extruder and the driving means for the strander is powered solely by the passage of the conductor through it as the conductor is being pulled by the capstan.

A more thorough understanding of my invention may be obtained from a consideration of the appended drawing.

In the drawing:

FIG. 1 is a side view of the apparatus of my invention.

FIG. 2 is an enlarged section taken through the strander of FIG. 1.

FIG. 3 is a plan view of an element of my invention.

FIG. 4 is an end view of the element of FIG. 3.

In FIG. 1 a strander indicated generally by the numeral 10 is driven by a gear mechanism generally indicated by the numeral 11 which is powered by the passage therethrough of a stranded conductor 12. The conductor 12 is advanced by means of a captan 13 and is taken up on a reel 14. The capstan 13 and reel 14 are conventional and are driven by means not shown. The strand 12 passes through an extrusion head 16 in which there is applied a tubular wall of insulation 17 and through a cooling trough 18 wherein the insulation is cooled. The head 16 is an element of an extruder 19 of which many types are known. The extruder 19 is connected by a gear train (not shown) to the capstan 13 in the usual manner and the speed of the capstan is varied in a known manner to adjust the wall thickness of the insulation 17 during the extrusion process.

The conductor 12 is made up of 7 wires or strands 21 wound 6 around one. This is known to result in a uniform conductor stand but other strands such as twisted pairs and 19 strand conductor configurations also come within the scope of utility of my invention. The strands 21 are wound on reels or spools 22, 23, 24, 25, 26, 27, 28 that are mounted on a horizontal shaft 29. The left end of the shaft 29 is supported in a journal 31 mounted on a standard 32. The standard 32 is supported on a platform 33 which also supports a standard 34 mounting a forward journal 36 for a stub shaft 37 into which the shaft 29 is inserted. The shaft 29 supports two end plates 38, 39 connected by three rods 41, 42, 43. The plate 38 has a central bushing 44 welded to it and set screws 46 in the bushing permit the plate to be locked onto the shaft. However, the shaft can be partially withdrawn to permit the mounting of the spools 22–28 in the strander 10. Three guide sheaves 47, 48, 49 are mounted on alternately opposite sides of the rod 41 to guide strands 21 from the respective reels 22, 23, 28. Similarly guide sheaves 51, 52 mounted on rod 42 receive strands from the reels 24, 25 in such a manner as to rotate these reels in opposite directions, and guide sheaves 53, 54 are mounted on opposite sides of the rod 43 to guide strands from the reels 26, 27. It is a preferred feature of my apparatus that the reels 22–28 rotate in alternately opposite directions relative to a frame 56 of the strander 10 comprising the plates 38, 39, rods 41–43, and shafts 29 and 37. This rotation of the reels 22–28 which is required to remove the strands from the reels is superimposed on the rotation of the reels along with the frame 56 which imparts the twist to the strands 21. The individual strands 21 leaving the sheaves 47–49, 51–54 are guided along the rods 41-43 through eyelets 57. Thence they pass through peripheral holes 58 in the plate 39 into the shaft 37 which is hollow and is provided with radial holes 59 for the passage of the strands. The strands then pass through a perforated guide plate 61 which rotates with the shaft 37 at the end of the shaft, and is formed into a twisted strand in a forming die 62 which is preferably stationary, but may also be made to rotate, within the scope of my invention. The strands 21 leave the reels 22–28 due to the urging of the capstan 13 upon the stranded conductor 12 which is formed in the die 62. Upon leaving the die 62 the strand 12 passes under an idler sheave 63, over a second idler sheave 64 and thence around a timing belt 66 supported on 4 sprockets 67, 68, 69, 70. The strand 12 then passes over the idler 63 and guide sheave 71 into the extrusion head 16. There is a high frictional coefficient between the strand 12 and the soft timing belt 66 and in passing around it the strand turns the belt and with it, the sprockets 67–70 of which the sprockets 68–70 are idlers but the sprocket 67 is mounted on a shaft 72 (FIGURE 3) of a miter gear box 73 wherein are bevel gears 74, 76 driving a shaft 77 to the end of which there is keyed a gear 78 which, through an idler 79 drives a gear 81 on the end of the shaft 37 and thus turns the frame 56 of the strander 10. The speed of rotation of the frame 56 is thus seen to be entirely dependent on the speed of advancement of the conductor 12 acting on the mechanism 11. There is no other source of power for the strander 10.

It is an important feature of the strander 10 that it should be low in mass and inertia so as not to put undue strain on the strand 12, and for this reason I have invented a tensioning means for the strander that is extremely simple and adds very little weight to my apparatus. It has already been noted that the reels 22–28 rotate in alternately opposite directions relative to the frame 56. To accomplish this I mount the reels on the shaft 29 so that the direction of wind of the wire on the reels is reversed on alternate reels. As can best be seen in FIGURE 2 the reels 22–28 are supported on bushings 82 having flanges 83. The bushings 82 fit closely to the shaft 29 and are lubricated to rotate freely on the shaft along with the reels since the friction between the reel flanges and the bushings is much greater than the friction between the bushings and the shaft. To assure the rotation of the bushings with the reels, relative to the shaft, they may be locked to the reel flanges by pins such as the pins 84 are other known methods. The flanges 83 have smooth outer surfaces 86 which may rotate against each other when the reels are rotated by the removal of strand but I prefer to insert washers such as a nylon washer 87 between the flanges of opposing bushings.

A compression spring 88 is mounted on the shaft 29 adjacent to the plate 39 and compresses a washer 89 against the bushing in the reel 28 thereby urging all the reels together and against the plate 38. The tension in the strands 21 can be changed by changing the spring 88 or by changing the compression of the spring by means of locking nuts 91, 92 turning on a threaded stub shaft 93 welded to the plate 39.

The embodiment of the features of my invention hereinabove described are understood to be exemplary rather than definitive. Other embodiments and modifications coming within the full scope of my invention are defined by the following claims.

I claim:
1. An apparatus for forming an insulated, stranded conductor comprising:
   (A) an extruder,
   (B) a rotating strander mounted upstream of said extruder, helically winding a plurality of wires, thereby forming said stranded conductor paying into said extruder,
   (C) a capstan pulling said conductor through said ex-extruder and said strander, and
   (D) driving means rotating said strander, said driving means being powered solely by the passage therethrough of said conductor being pulled by said capstan,
whereby the speed of rotation of said strander is responsive to changes in the speed of advance of said conductor.

2. An apparatus for forming an insulated, stranded conductor comprising:
   (A) an extruder,
   (B) a strander mounted upstream of said extruder helically winding a plurality of wires, thereby forming said conductor paying into said extruder, said strander comprising:
      (a) a central shaft,
      (b) a plurality of wire spools mounted coaxially on said shaft,
      (c) a frame mounted rotatably around the axis of said shaft,
      (d) a plurality of guides mounted on said frame guiding said wires from said spools,
      (e) a forming die mounted coaxially of said shaft, said wires converging in said die,
   (C) a capstan pulling said conductor through said extruder and said strander, and
   (D) driving means rotating said frame, said driving means being powered solely by the passage therethrough of said conductor being pulled by said capstan,
whereby the speed of rotation of said strander is responsive to changes in the speed of advance of said conductor.

3. A strander comprising:
   (A) a central shaft,
   (B) a frame mounted rotatably around the axis of said shaft,
   (C) a plurality of spools, each holding a supply of strand
      (a) mounted coaxially on said shaft,
      (b) said spools being slidable lengthwise on said shaft,
      (c) said spools rotating alternately in opposite directions relative to said frame,
   (D) means urging said spools together on said shaft, thereby applying tension to said strand leaving said spools,
   (E) a plurality of guides mounted on said frame guiding said strand from said spools,
   (F) a forming die mounted coaxially of said shaft, said strands converging in said die,
   (G) driving means rotating said frame,
   (H) a capstan, removed from said strander, pulling said strands from said spools through said forming die and said driving means, and
   (I) said driving means being powered solely by the passage therethrough of said strands being pulled by said capstan,
whereby the speed of rotation of said strander is responsive to changes in the speed of advance of said conductor.

References Cited by the Examiner
UNITED STATES PATENTS

| | | | |
|---|---|---|---|
| 627,258 | 6/1899 | Hallidie | 57—58.32 X |
| 2,147,065 | 2/1939 | Somerville | 57—58.32 |
| 2,763,979 | 9/1956 | Swanson | 57—12 X |

FRANK J. COHEN, *Primary Examiner.*

D. E. WATKINS, *Assistant Examiner.*